L. L. CUSTER.
DRIVING MECHANISM FOR AUTOMOBILES.
APPLICATION FILED MAR. 3, 1919.

1,391,098.

Patented Sept. 20, 1921.

INVENTOR.
Levitt Luzern Custer,
BY Howard S. Smith
his ATTORNEY.

UNITED STATES PATENT OFFICE.

LEVITT LUZERN CUSTER, OF DAYTON, OHIO.

DRIVING MECHANISM FOR AUTOMOBILES.

1,391,098.  Specification of Letters Patent.  Patented Sept. 20, 1921.

Application filed March 3, 1919. Serial No. 280,380.

*To all whom it may concern:*

Be it known that I, LEVITT LUZERN CUSTER, a citizen of the United States, residing at Dayton, in the county of Montgomery and State of Ohio, have invented certain new and useful Improvements in Driving Mechanism for Automobiles, of which the following is a specification.

This invention relates to new and useful improvements in driving mechanism for automobiles.

The principal object of the invention is to provide a simple and efficient driving mechanism for automobiles, that eliminates universal joints, slip joints, radius rods and torque rods.

Another object of the invention is to provide a drive for automobiles that is absolutely positive in operation, with means provided to resiliently support the engine. The engine does not ride on the hard axle, nor are its vibrations communicated to the body of the car. The engine is so supported by the axle, and the latter so secured to the springs, that said springs will be twisted by engine and car vibrations to absorb the vibrations of one without communicating them to the other.

Other important and incidental objects will be brought out in the following specification, and particularly set forth in the subjoined claims.

Figure 1:
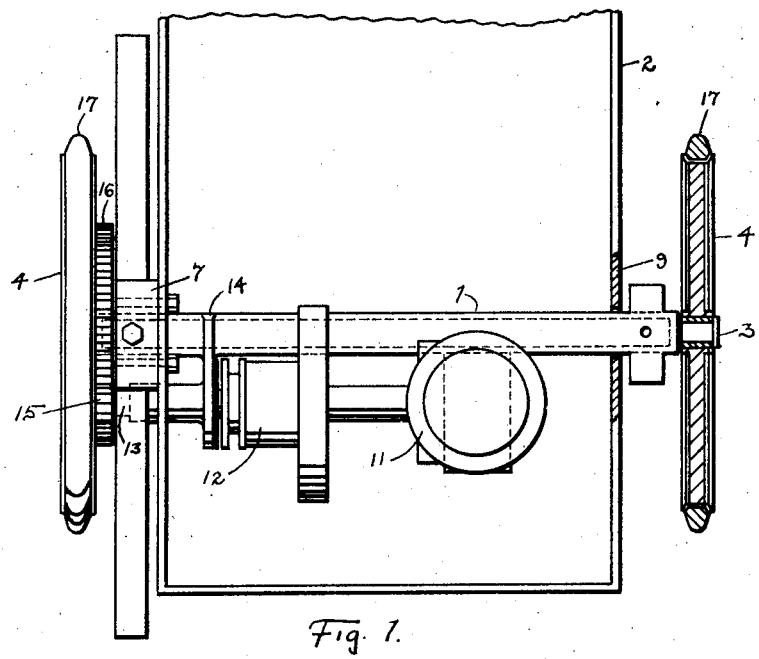
Figure 2:
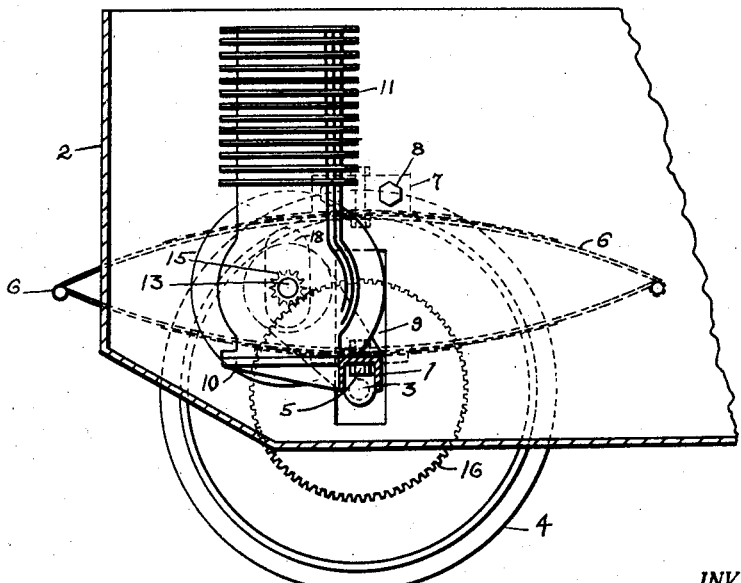

One form of embodiment of my invention is illustrated in the accompanying drawings, of which Figure 1 is a top plan view of the rear end of an automobile containing my improved driving mechanism. And Fig. 2 is a side elevational view thereof, partly in section.

Throughout the specification and drawings, similar reference characters denote corresponding parts.

In a detailed description of the form of embodiment of my invention shown in the drawings, the numeral 1 designates the rear axle of an automobile and 2 the body of the machine. While the form of body shown is one adapted for juvenile use, any other type of automobile body may be employed.

The axle 1 has a journal extension 3 at each end for a wheel 4. Supported by each outer end of the axle 1, and preferably secured thereto by a bolt 5, is the lower leaf of a full elliptic spring 6. Bolted to the upper leaf of said spring is a block 7 that is secured by transverse bolts 8 to the body 2. Any other type of spring, and means of connecting it to the axle and body of the car, may be employed without departing from the spirit of my invention.

Provided in each side of the body 2 is a vertical slot 9 through which a respective end of the axle 1 extends, and through which it is vertically movable to allow said body a resilient movement on the springs 6 without striking the hard axle.

Mounted on a ledge member or plate 10 fixedly secured to the axle 1, is a one-cylinder explosive engine 11, which, when it vibrates, will twist the lower leaf of the springs 6 without communicating its vibrations to the body of the automobile. While I have shown in the drawings a single-cylinder engine, any other type of motor may be employed if desired. Where my driving mechanism is used on trucks, a more powerful explosive engine than that shown, may be mounted on the ledge member 10.

Through a clutch 12, which may be any one of the common types, power is transmitted from the engine 11 to a shaft 13 whose inner end is journaled in a bearing bracket 14 secured to the axle 1. Fast on the outer end of the shaft 13 is a pinion 15 which meshes with a large gear 16 fixedly secured to one of the wheels 4 to drive the same, and through it the automobile. In a large car or truck, both wheels could be so driven to advantage. In the type of automobile shown, the wheels 4 are interchangeable so that when the tire 17 on the driving wheel starts to show excessive wear, the other wheel 4 may be substituted for it.

Provided in one side of the body 2 of the automobile, is a vertical slot 18 through which the pinion shaft 13 projects, and in which it is vertically movable in response to vibrations of the wheel. The slot 18 will not only prevent the body 2 of the car from striking the pinion shaft 13, but will also prevent the latter from striking the body when the wheel 4 which it drives, encounters an obstruction or depression in the road.

By virtue of the fact that the engine 11 is mounted on the ledge member 10 which projects horizontally from the axle 1, the vibrations of said engine during its operation will not be communicated to the body of the car, for they will be absorbed by the twisting of the lower leaves of the springs 6 in response to the vibrations of the ledge 10 supporting the engine. For the same reason, shocks due to the wheels striking an obstacle or depression in the road, will be so modified as not to affect the engine; in other words, the engine will not ride on a hard axle. Furthermore, such shocks to which the wheels are exposed, will be so modified by the springs 6, as to be largely absorbed thereby before being communicated to the body of the automobile. It will thus be seen that I have not only provided a simple and efficient positive drive for an automobile, but one in which the engine does not communicate its vibrations to the body of the car, as well as one in which both the engine and the car are well protected from shocks or jolts incident to the wheels striking obstacles or depressions in the road. As has been stated before, my improved driving mechanism also eliminates universal joints, slip joints, radius rods and torque rods used in other forms of driving mechanism.

Having described my invention, I claim:

1. In a device of the type specified, the combination with an axle of an automobile, a wheel freely secured on each end of said axle, of resilient means secured to the latter, and adapted to be twisted by it, a ledge fixedly secured to said axle, a prime mover supported by said ledge, driving mechanism connecting said prime mover with a wheel on said axle, and a body supported by said resilient means, provided with a vertical slot through which each axle end is vertically movable for the purpose described.

2. In a device of the type specified, the combination with an axle of an automobile, a wheel freely secured on each end of said axle, of resilient means secured to said axle and adapted to be twisted by it, of a ledge fixedly secured to said axle, a prime mover supported by said ledge, a shaft adapted to be rotated by said prime mover, a pinion on the outer end of said shaft, a gear on one of said wheels in mesh with said pinion, and a body supported by said resilient means, provided with a vertical slot through which said pinion shaft is vertically movable for the purpose described.

In testimony whereof I have hereunto set my hand this 28 day of February, 1919.

LEVITT LUZERN CUSTER.

Witness:
HOWARD S. SMITH.